United States Patent [19]

Safford

[11] 4,168,395
[45] Sep. 18, 1979

[54] START/STOP TELEPRINTER SCRAMBLER

[75] Inventor: Laurance F. Safford, Washington, D.C.

[73] Assignee: American Standard Inc., New York, N.Y.

[21] Appl. No.: 118,224

[22] Filed: May 19, 1961

[51] Int. Cl. .................................................. H04L 9/02
[52] U.S. Cl. .......................................... 178/22; 328/37
[58] Field of Search ................. 328/37, 49, 48; 178/22

[56] References Cited

U.S. PATENT DOCUMENTS

| | | | |
|---|---|---|---|
| 3,185,765 | 5/1965 | Berjon | 178/22 |
| 3,965,296 | 6/1976 | Miller | 178/22 |
| 3,991,268 | 11/1976 | Goodall | 178/22 |

Primary Examiner—Howard A. Birmiel
Attorney, Agent, or Firm—John P. Sinnott; Robert G. Crooks

EXEMPLARY CLAIM

1. A start/stop cryptographic telegraphy terminal-equipment comprising electronic means for generating clock pulses, means responsive to the clock pulses for generating timing pulses occurring at a substantially predetermined rate less than the occurrence rate at which said clock pulses are generated, means responsive to the generated timing pulses for generating a cryptographic-key signal and means for initiating the generating of the clock pulses in response to a telegraph start signal supplied to the equipment, said last named means including means for combining the telegraph and cryptographic-key signals.

31. In combination, a pair of parallel binary signal sources, a counting chain having a plurality of stages, means for advancing the count of said chain when a first predetermined status of the convinced Boolean values of said signals is achieved, and means for resetting the count in said chain to the first stage when a different predetermined status of the combined Boolean values of said signals is achieved.

36 Claims, 7 Drawing Figures

START/STOP TELEPRINTER SCRAMBLER

The present invention relates generally to on-line cryptographic telegraphy systems and more particularly to automatic start/stop types of such systems that may be used in half-duplex or "Keyboard-to-Keyboard" manner.

Prior start/stop cryptographic telegraphy systems have generally proven unsatisfactory because they usually employ key-tapes for generating the cryptographic-key.

Key-tape systems have proven unsatisfactory because the tape-sensing components require very critical adjustment and are easily rendered inoperative or malfunctioning by dust and moisture. Such systems require complex and critical tape-perforation facilities requiring careful and constant inspection to insure satisfactory production of key-tapes. These systems have also been undesirable since the tapes have limited shelf life due to shrinkage. This comes about when the tapes are stored for any great period of time as is frequently necessary. The great expense involved in preparation, storage, distribution and accounting of the key-tapes has proven burdensome. Added cost results because the key-tapes may not be reused for security reasons. In military use, key-tapes have been undesirable since they necessitate constant logistics between supply centers and front line troops.

Key-tape systems no longer receive wide acceptance because the equipment associated therewith is too bulky and delicate, particularly for military use in the field, on aircraft, or on board ship. In order to keep such systems functioning properly, the apparatus requires excessive maintenance and adjustment. Since it is impossible to resynchronize these units while they are in operation the machines must frequently be shut off during the middle of a message or gibberish is transmitted.

Security problems have arisen with key-tape apparatus since it is possible for undesired personnel to decipher the code being transmitted and thereby interpret the message being sent. This occurs since the system may employ badly biased key-tapes resulting in excessive "zeros" or "ones" being generated. Key-tape systems have also enabled interception of messages since the transmitted signals cause electromagnetic energy that can easily be detected to be radiated from power supply lines.

In addition, prior start/stop telegraph systems have had no provision for preventing inadvertent transmission of clear text either as a result of the operator's negligence or physical malfunctioning of the equipment. These defects in the prior art have caused considerable loss in security.

Accordingly, it is an object of the present invention to provide a new and improved start/stop cryptographic telegraphy unit that is simple, compact, lightweight, rugged, reliable, relatively inexpensive and contains no moving parts.

It is another object of this invention to provide a new and improved start/stop cryptographic telegraphy unit wherein the unit is completely self-contained, requiring no additional parts to be inserted therein for unlimited telegraphic use.

It is a further object of the present invention to devise new and improved start/stop cryptographic telegraphic equipment that is completely safe for security purposes and in which there is absolutely no bias between generated mark and space signals.

It is a still further object of this invention to provide a new and improved start/stop cryptographic telegraph terminal-equipment that is capable of generating a very large number of unique operating cycles and in which it is also possible to preload the system with a great magnitude of different possible starting conditions.

It is a still further object of the invention to provide a start/stop cryptographic telegraphy system wherein the transmitted enciphered signal is compared with the text input signal from the local teletypewriter and in which automatic shorting-out of the equipment occurs when these signals are alike for a predetermined number of characters and an alarm is accordingly actuated.

It is still yet another object of the present invention to provide start/stop cryptographic telegraphy apparatus wherein the receiver contains means for correcting the synchronism of the receiving Key-generator to bring it back in step with the transmitting Key-generator. Character-synchronization is automatically restored in about five characters, due to the action of the prolonged "STOP"-baud, but the receiving Key-generator by that time is usually out-of-step by five (5) timing pulses.

The present invention comprises a two-way regenerative printing-telegraph repeater, possessing the added cryptographic feature that half of the intelligence-bauds on the average are reversed in polarity in a programmed, pseudo-random manner.

The system comprises a unit for combining the received ciphered telegraphy signal with the locally generated cryptographic-key signal to produce a clear-text signal which may be supplied to a standard teletypewriter. The output signal of the key-generator is not initiated until the received signal is first supplied to the combining or mixer unit. When the received signal is first fed to the mixer unit, it actuates a timing and control unit that sequentially produces a start signal, timing pulses, and a stop signal; the timing pulses control the key-generator which along with the start and stop signals control the mixer unit. In addition, it is possible for the operator to re-synchronize the receiving key-generator by inserting or deleting timing-pulses so that it may be brought back into step with the transmitting key-generator.

The transmit channel contains the identical mixer as the receive channel wherein the text-signal generated by the teletypewriter is combined with the cryptographic-key signal to produce the cipher-signal to be transmitted either by radio or land line. The start-signal generated by the teletypewriter also initiates operation of the start/stop timing and control unit which supplies timing pulses to the key-generator in addition to stop and start pulses to the mixer unit. The transmit channel also contains means for comparing the actual transmitted cipher signal with the text signal produced by the teletypewriter. Means for producing an alarm signal to the teletypewriter operator when the text and cipher signals are identical for a predetermined number of characters is employed in the transmit channel, plus provision for automatically shorting-out the equipment thereby transmitting a continuous marking signal when such similarity occurs.

The above and still further objects, features and advantages of the present invention will become apparent upon consideration of the following detailed description of one specific embodiment thereof, especially when taken in conjunction with the accompanying drawings, wherein.

Figure 2:
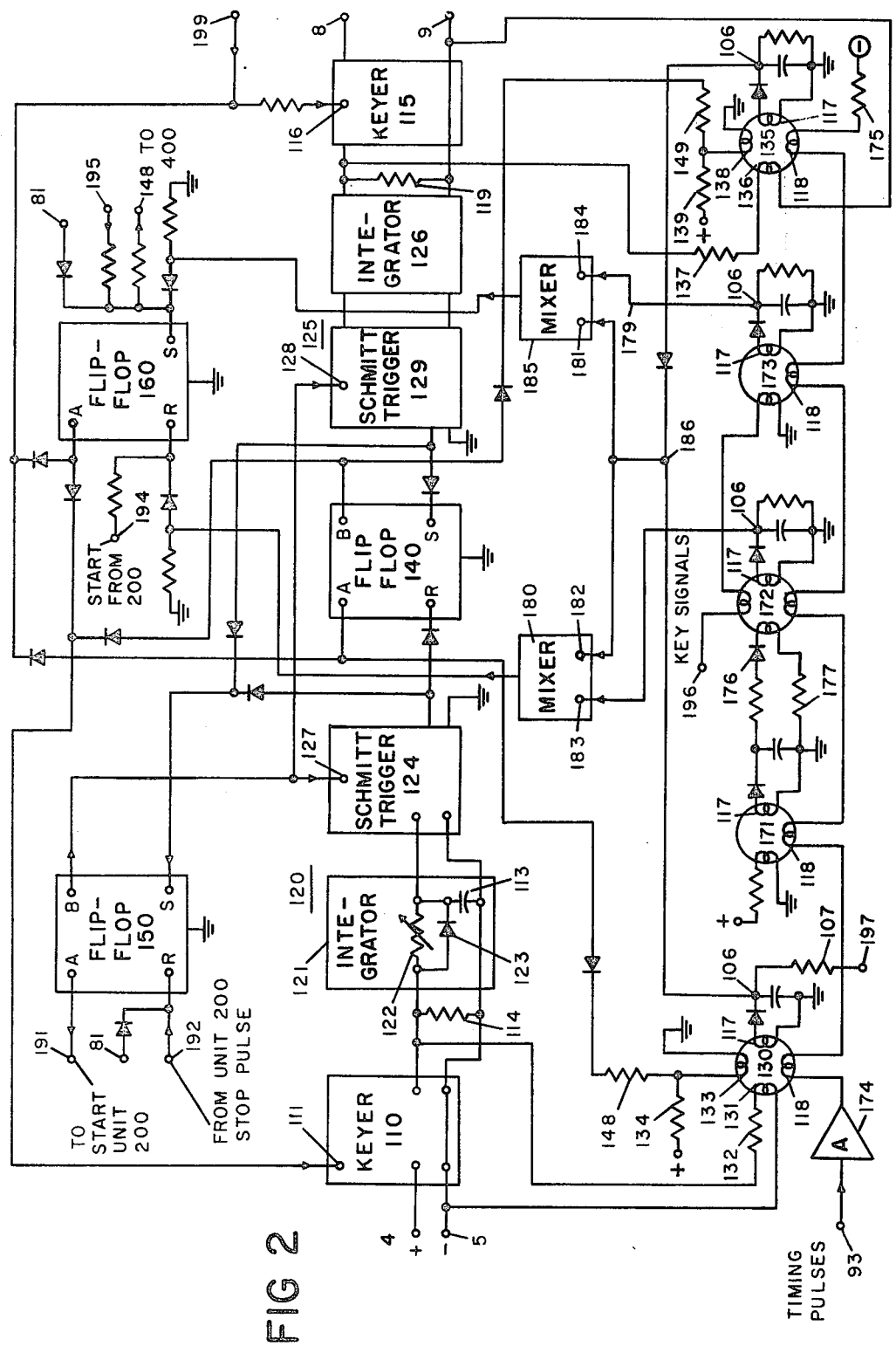
FIG. 2 is a schematic diagram of the Mixer-Keyer Unit, 100.
Figure 4:
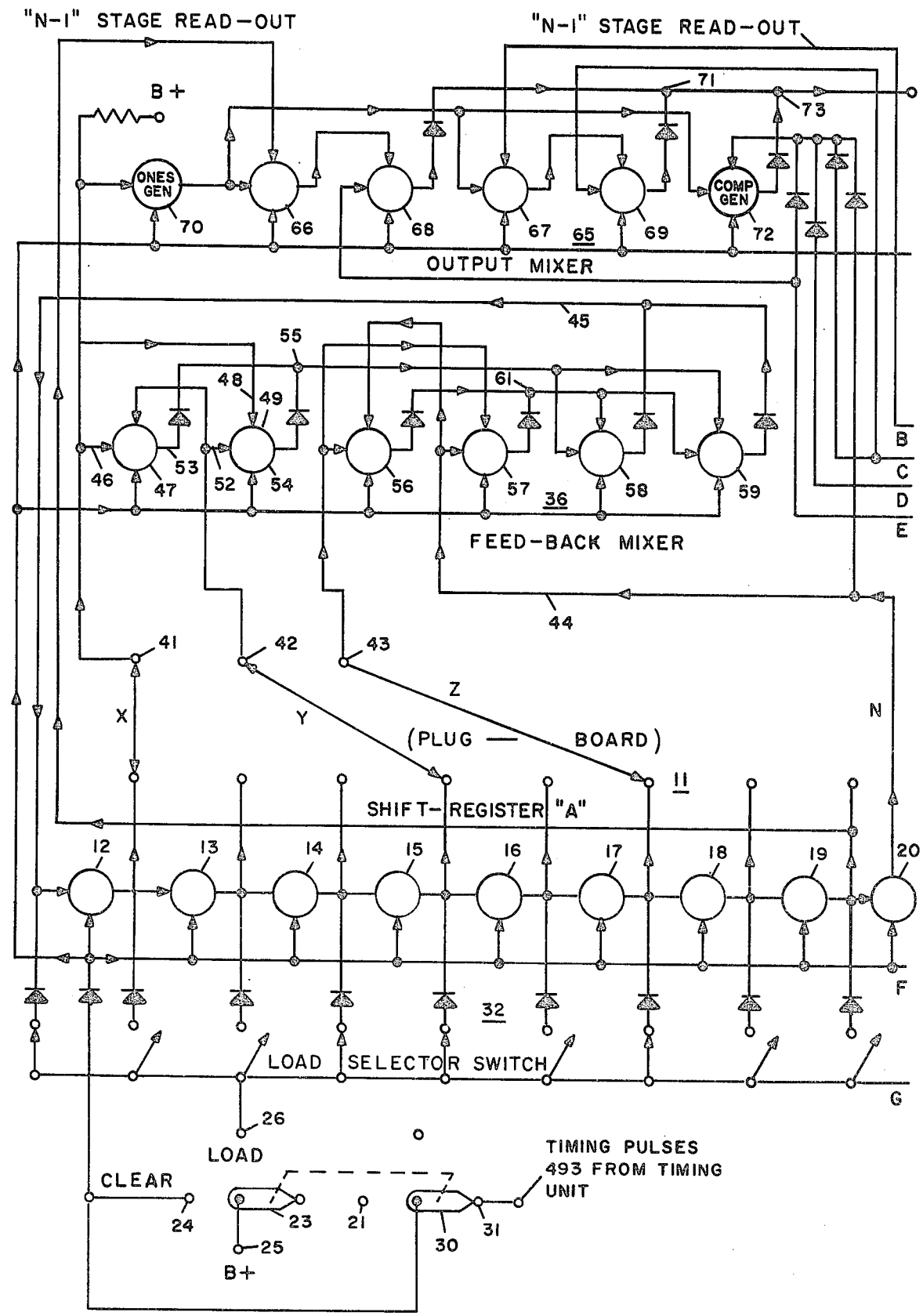
Figure 5:
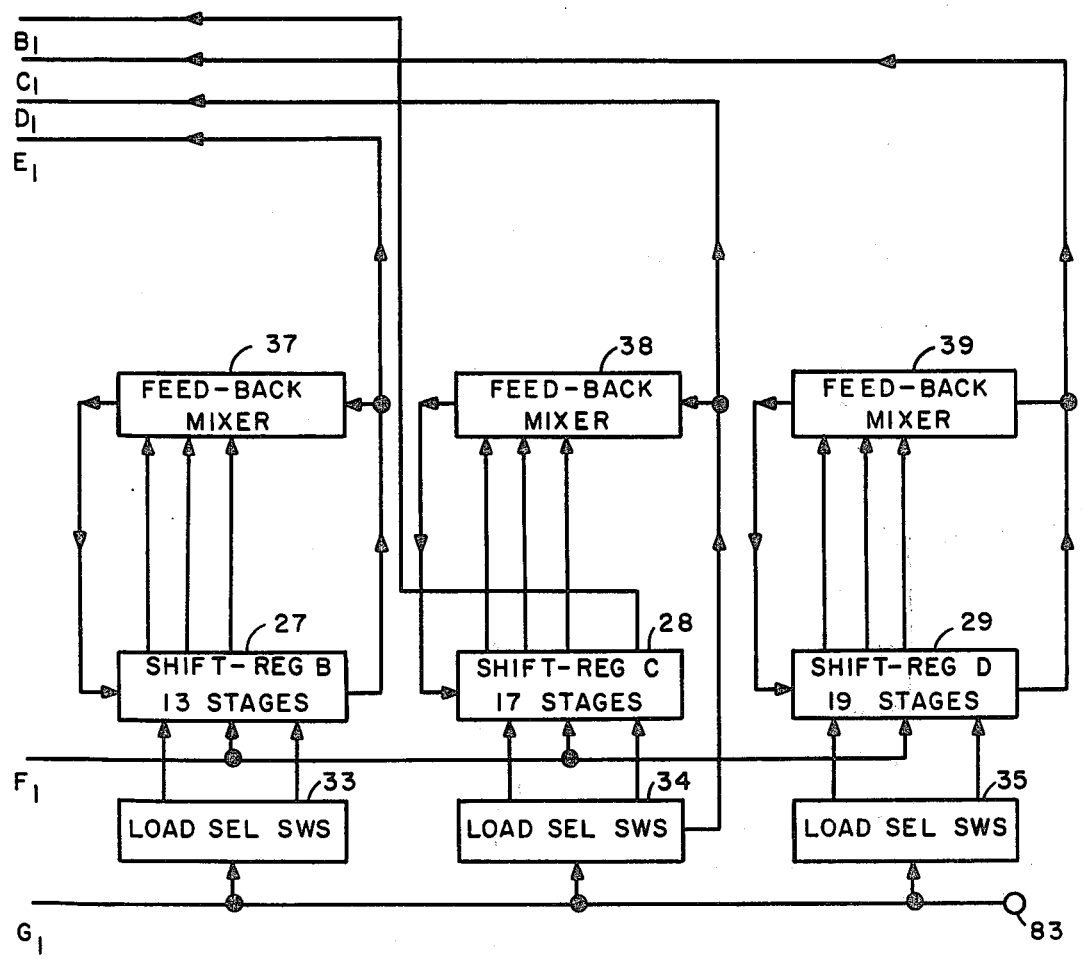
Figure 6:
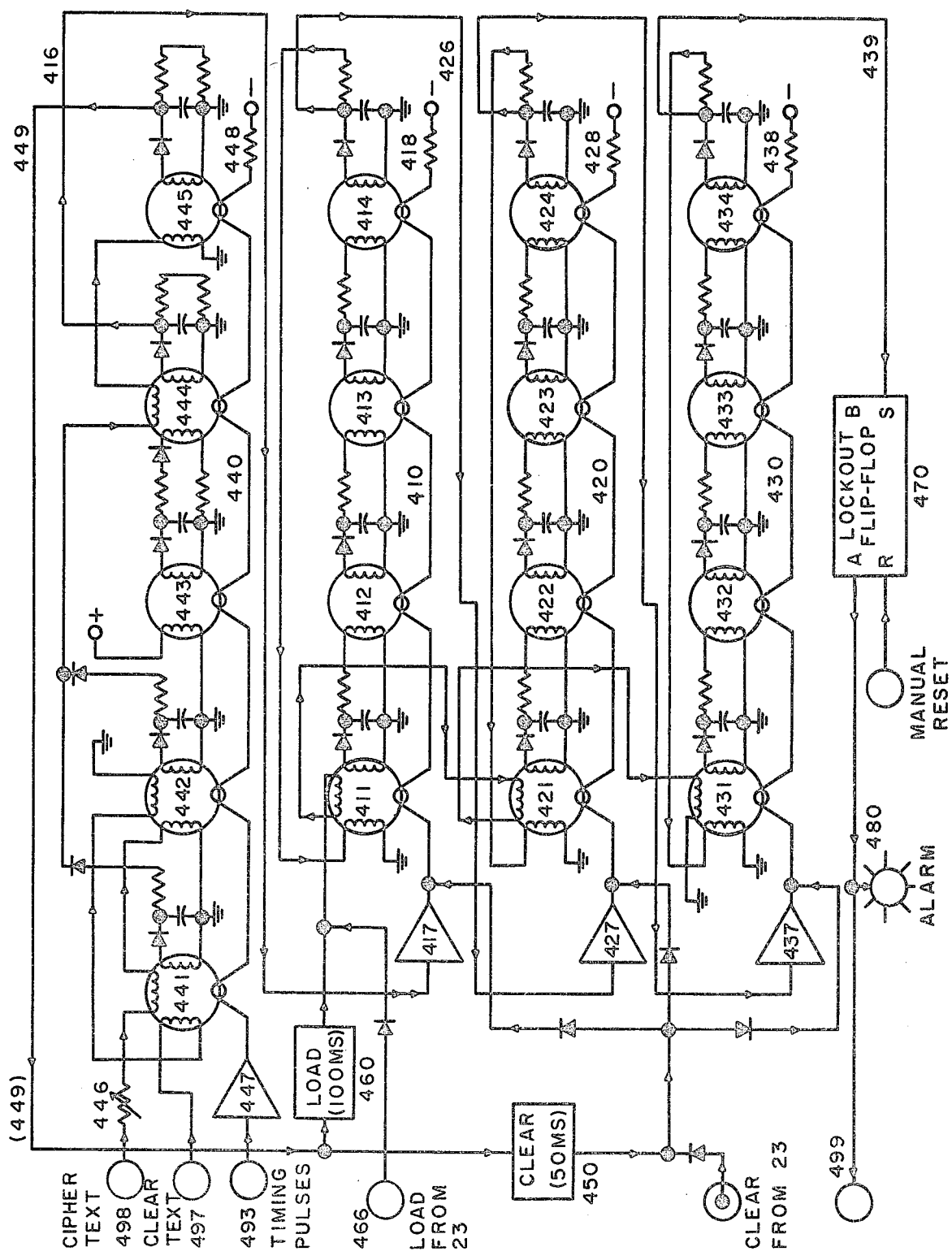
Figure 7:
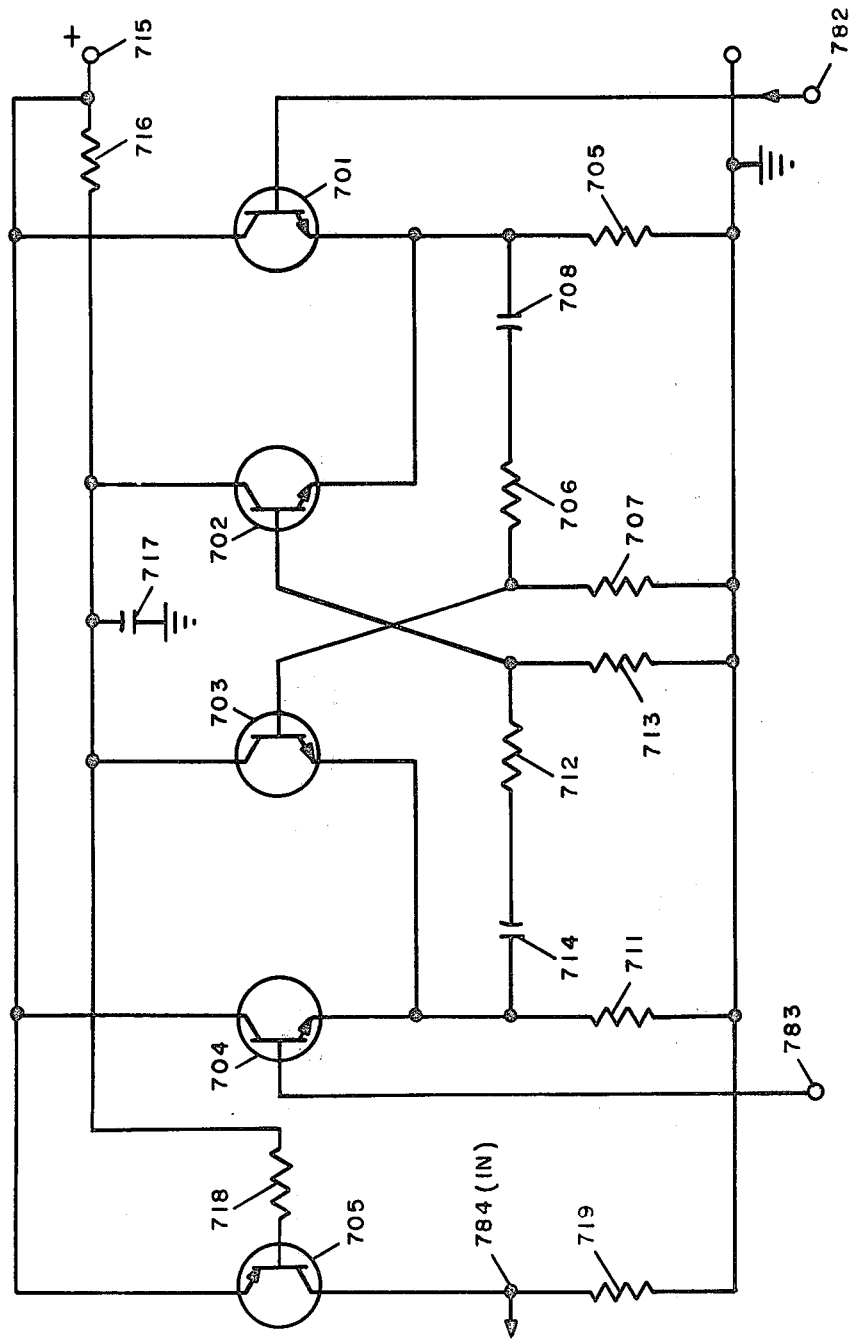

FIGS. 4 and 5, together, are a block diagram of the Key-Generator, (300);

FIG. 6 is a schematic diagram of the Comparator, (400), the fourth major functional unit, with its associated alarm and lockout circuit; and FIG. 7 is a circuit diagram of one preferred form of the mixer employed in FIG. 2.

Figure 1:
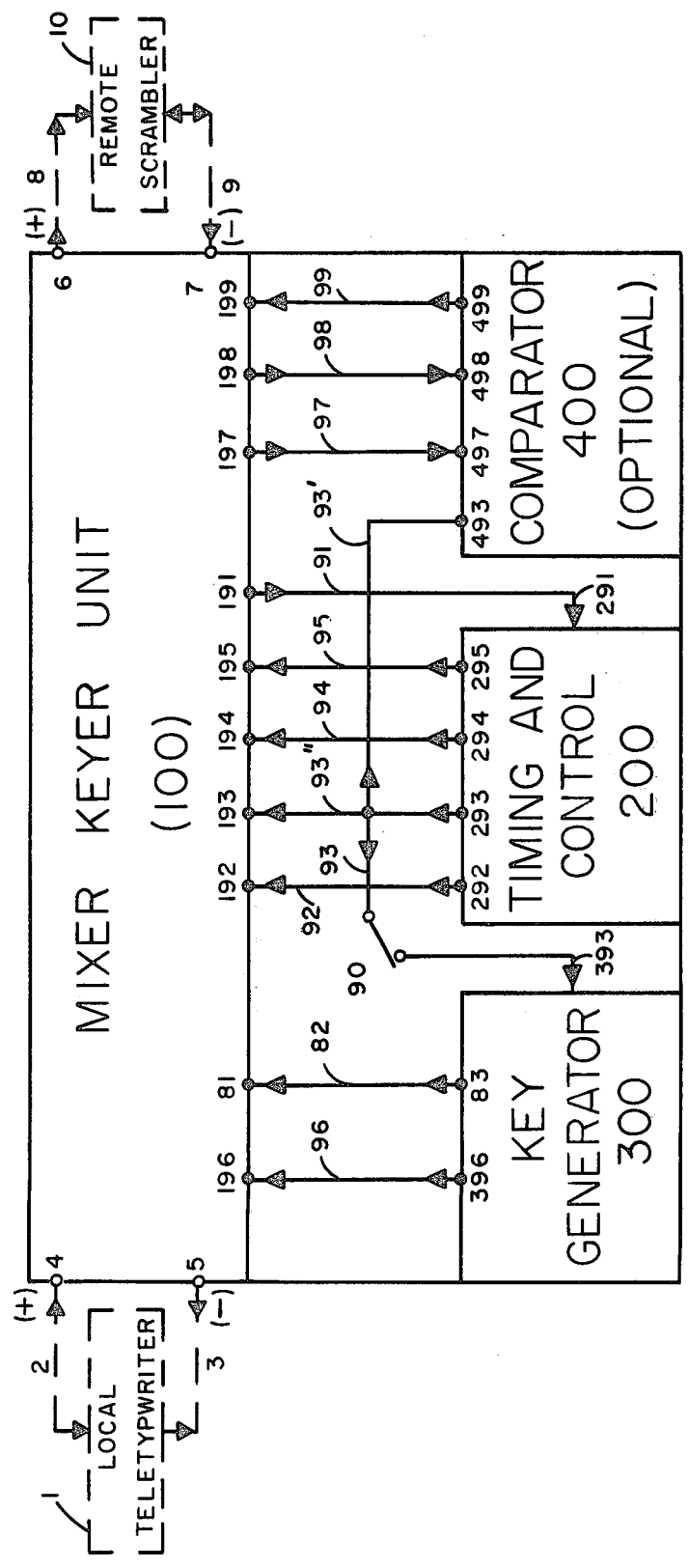
FIG. 1 is a block or flow diagram of the complete system.

FIG. 1, the system block diagram, shows the four major functional units of the Start/Stop Magnetic Teleprinter Scrambler plus the associated equipments and circuits which are essential to its operation, but does not show the power supply, filters, etc., which are obviously necessary. Local teletypewriter 1 supplies 120 volt 60 ma power via the local loop 2, 3 to the teletypewriter terminals 4 and 5, and may transmit clear-text teletype signals or receive them, according to the direction of transmission. In similar manner, the remote cryptographic apparatus 10 transmits or receives enciphered teletype signals via the line-terminals 6 and 7 and the telegraph-line 8, 9. The required 120 volt 60 ma power may be supplied by the remote apparatus 10, by the power unit (not shown), or by an independent line-battery (not shown). In the stand-by condition (between messages) and in the stop or rest condition (between characters of a message) both the local-loop 2, 3 and the line 8, 9 are energized by 60 milliampere currents, all keying contacts and other keying devices on the circuits being closed.

The mixer-keyer unit 100 senses the first cessation of current from either local teletypewriter 1 or remote apparatus 10 which indicates the beginning of a start pulse. After an "integrating" delay of about 4 to 7 milliseconds for transient suppression, unit 100 generates a trigger-pulse to actuate two internal flip-flops (described infra) which lock the mixer-key 100 in the transmit (or receive) condition, as appropriate, and energize, over lead 91, the timing and control unit 200, which has been cut-off during the rest period. After a few milliseconds more delay, unit 200 supplies a "start" control pulse to mixer-keyer unit 100 over lead 92, which cuts-off, i.e. opens, the transmit or receive keyer thereby generating a START (no current) signal about one-half baud length after the received start signal. This START signal is supplied to the line or to the teletypewriter that did not produce the initial START signal, depending on the direction of message transmission.

Following the START control pulse, supplied by unit 200 to lead 92, unit 200 sends out 5 equally spaced timing-pulses, over leads 93, 93' and 93" to the key generator 300, comparator 400 and mixer-keyer unit 100, each timing pulse occurring near the middle of a received intelligence-baud. One baud-length after the fifth timing pulse, timing and control unit 200 sends a "stop" control pulse to mixer-keyer unit 100 over lead 94 which closes the transmit or receive keyer thereby sending out a STOP signal, which continues until the next input START-signal has been sensed and the corresponding "start" control pulse sent to mixer-keyer unit 100. It should be noted that the outgoing START and STOP signals, whether transmitting or receiving, are originated by timing and control unit 200 and not within the mixer-key unit 100. One baud-length after the "stop" control pulse, unit 200 feeds a "reset" pulse via lead 95 to mixer-keyer unit 100, which then de-energizes lead 91 and turns off unit 200, thereby completing the operating cycle for that character.

For the clear-text mode of operation, i.e. no ciphered signals, spring loaded switch 90, normally connecting terminals 293 and 393 together via lead 93, is manually opened thereby breaking lead 93 and disabling key-generator 300 because no timing pulses are supplied thereto from unit 200. The system thus degenerates to a two-way regenerative repeater and the input intelligence-bauds appear as the output intelligence-bauds, unaltered in polarity but delayed by about ½ baud-length. When switch 90 is released, each timing pulse fed to the key-generator 300 over lead 93, produces a binary-key ("ONE" or "ZERO") which is supplied via lead 96 to the mixer-keyer unit 100, where it is suitably combined with the input intelligence-baud. A "ONE" key-digit produces polarity-reversal; a "ZERO" key-digit produces no-charge in the intelligence baud fed through unit 100. The output signal from key-generator 300 is a programmed pseudo-random binary-key of substantially infinite length, with "ONES" and "ZEROS" in a balanced 50/50 ratio.

The comparator (400) is an optical feature of this invention. For unattended operation on a full-duplex tape-relay circuit it is a necessity: for keyboard-to-keyboard operation on a half-duplex circuit it is a luxury, with choice based on economics. The input clear-text (teletype) signal to the comparator is received over lead 97 from the mixer-keyer unit 100, the output cipher (line) signal is received over lead 98, also from the mixer-keyer unit 100. The two signals are compared on a baud-by-baud basis. If there is agreement for 64 consecutive bauds an alarm is sounded and displayed, and lead 99, connected back to the mixer-keyer unit 100 is energized until a manual reset button has been operated. The signal on lead 99 turns-on, i.e. closes, a line-keyer in mixer-keyer unit 100, thereby shorting out the scrambler and preventing further transmission (but not reception), as described more fully, infra. In case the equipment fails to encipher the input clear-text, the comparator 400 gives the alarm and shorts-out the equipment in 13 teletype characters or just over 2 words. The false-alarm rate is negligible, 1 in $10^{13}$ words.

The Mixer-Keyer Unit 100 (FIG. 2) performs the sensing, switching, sampling, mixing and keying (i.e. signalling) functions of the equipment, and may be considered the "heart" of the system.

The local (teletype) loop circuit 2, 3 is continued through the "+" terminal 4, local loop keyer 110, loop resistor 114, and "−" terminal 5. With 60 ma loop current flowing from local unit 1 there is a 12 volt drop through "loop-resistor" 114, and, consequently, a 12 volt potential across integrator 121 of the transmit (anti-false-start) trigger 120. In identical manner, the telegraph-line circuit 8, 9 is continued through the "+" terminal 6, line keyer 115, line-resistor 119, and "−" terminal 7, with a normal 12 volt drop across integrator 126 and the receive (anti-false-start) trigger circuit 125.

The preferred form for keyers 110 and 115 is a conventional silicon power transistor rated at 120 volts and 60 milli-amperes or better, but cascaded transistors of lower voltage rating or a high-grade sensitive relay such as the Sigma type 72 may be used, as well known by those skilled in the art. During the "stand-by" and "rest" condition of the system when a steady marking signal is being transmitted, keyer circuits 110 and 115 are turned "ON" and pass the 60 milli-ampere currents of their respective circuits. When transmitting, the local loop keyer 110 is locked in the "ON" condition by the voltage supplied to its control terminal 111 from the B output terminal of flip-flop 140, but line keyer 115 is free to make and break line circuit 8, 9 in response to control signals supplied to control terminal 116 thereof from the A output terminal of flip-flop 160. When receiving, line keyer 115 is locked in the "ON" condition by the voltage supplied to terminal 116 from the A output terminal of flip-flop 140, but loop keyer 110 is free to "make" and "break" the local loop circuit 2, 3 in response to control signals from the A output terminal of flip-flop 160. Sneak-paths in the keyer-control circuit are broken-up by six isolating diodes, in a manner well known to those skilled in the art.

The anti-false-start triggers 120 and 125 contain conventional integrators 121 and 126 plus Schmitt triggers 124 and 129 of transistor design. The integrators prevent transients and momentary signal interruptions from actuating the Schmitt triggers and their time constants are adjusted by means of variable resistors 122 and 127 to suit the baud-length, for operating speeds of 60 to 100 wpm. Optimum integrator time constants are 7.3 ms for 60 wpm, and 4.5 ms for 100 wpm.

Schmitt triggers 124 and 129 are permanently biased to fire when the output voltages of integrators 121 and 126 fall to a predetermined voltage. They are energized during the "stand-by" and "rest" conditions of the system from the voltage supplied to their power input terminals 127 and 128 from the "B" output terminal of pulse-control flip-flop 150, but their power is cut-off immediately after the start signal has been sensed. This is because flip-flop 150 changes state when the start signal is sensed, as described infra. The output signal from trigger 124 is fed to the "R" input-terminal of flip-flop 140 and to the "S" input-terminal of pulse control flip-flop 150 via isolating diodes. The output signal of trigger 129 supplies the "S" input-terminal of flip-flop 140 and the "S" input-terminal of flip-flop 150, sneak paths being broken-up by suitable isolating diodes.

The capacitors of integrators 121 and 126 are rapidly charged during the stop baud and subsequent rest period from the voltage across resistors 114 and 119, through diodes 123 (not shown for integrator 126). When a start (no-current) baud is received, from either the loop or the line, the associated capacitor discharges through the associated variable resistor and fixed resistor 114 or 119. As the capacitor discharges, the input voltage of the Schmitt trigger falls until the "critical" or "threshold" value is crossed and the Schmitt trigger fires. Because of the integrating effect, the Schmitt triggers are insensitive to circuit-transients and even to momentary interruptions of the circuit or rapid fading on a radio circuit, yet they respond (after the desired one-third baud delay) to legitimate start (no-current) signals. It should be noted triggers 120 and 125 are essentially voltage-sensitive devices and that one of them delivers a single trigger-pulse for each successive character received. The charges on the two capacitors follow the signals on the loop and line, in a delayed and integrated manner, but the two Schmitt triggers are cut-off except during rest periods and stand-by conditions due to the switching action of flip-flop 150 in response to the start signal.

The samling-gates 130 and 135 are conventional 4-winding, one-core-per-bit magnetic cores, identical with the other cores employed in this equipment. The input windings 131 and 136 of cores 130 and 135, respectively, are shunted across the loop and line resistors 114 and 119, with series resistors 132 and 137 limiting the input current to an optimum value. The inhibit windings 133 and 138 of cores 130 and 135, respectively, are permanently biased to negative magnetic saturation by the supplies connected to current limiting resistors 134 and 139. Resistors 134 and 139 are designed so the cores 130 and 135 will switch slowly from positive to negative saturation and slowly back to positive saturation again, following the "loop" and "line" signals, without generating appreciable voltage in their output windings. The "shift" or "drive" windings 118 of these cores are connected in a series-string with the drive windings 118 of cores 171, 172, 173 of the key-converter 170 and are driven from a single driving-amplifier 174, drive current being limited by resistor 175. Timing pulses are fed to windings 118 through terminal 193 from unit 200 (FIG. 1) a short time after the middle of each of the five input intelligence bauds. These pulses sense and read-out the signals stored in sampling gates 130 and 135. Positive saturation in a core results in a "one" signal generated in output winding 117 and negative saturation causes a zero to be produced. Output winding 117 of sampling gate 130 is connected through resistor 107 to current output terminal 197 which supplies current pulses through lead 97 to input terminal 497 of comparator 400. Output windings 117 of cores 130 and 135 are connected to voltage output terminals 106 through respective isolating diodes, thereby feeding voltage pulses indicative of the local loop and line signals supplied to the equipment to binary half adder circuits 181 and 182.

Cores 130 and 135 produce no signals in response to the start and stop bauds from terminals 4, 5 or 8, 9 because no timing pulses are supplied to windings 118 thereof when the start and stop bauds occur. In order to obtain an output signal in windings 117 of cores 130 and 135, it is necessary for the input and timing windings be simultaneously energized.

In order to prevent simultaneous "ones" read-outs from cores 130 and 135 for a given character, their inhibit windings 133 and 136 are coupled to the output terminals A and B, respectively of flip-flop 140, via current limiting resistors 148 and 149, and suitable isolating diodes. The current in winding 133 or 138 produces a flux in the respective core slightly greater than the flux produced by the input current. Consequently, one of the sampling gates 130 or 135 is locked or clamped in a condition of negative magnetic-saturation for the duration of the character and, in fact, until flip-flop 140 is switched over to the opposite condition.

The three flip-flops 140, 150 and 160 are of conventional set/reset design and are of identical construction. Terminals "A" and "B" are the output terminals, one of which is ON (conducting) and the other OFF (cut-off or non-conducting). Terminals "R" and "S" are the input terminals, one of which is energized by a positive pulse when required. An input pulse to the "R" terminal causes the "A" output terminal to be cut-off and the "B" output terminal to conduct while the converse is true for an input pulse to the "S" terminal. The flip-flops are designed to respond to positive control pulses only, but if desired the elements may be responsive to negative pulses, in which case other pulse polarities would have to be reversed for compatibility and proper operation.

During the rest period between characters, either output terminal (A or B) of flip flop 140 may be conducting, depending on the direction of transmission for the previous character. A control pulse from trigger 124 in response to a start baud from teletypewriter 1 energizes input terminal "R" of flip-flop 140 causing its output terminal "A" to be cut-off, and its output terminal "B" to become conducting. Thus, control signals are supplied to control terminal 111 of keyer 110 and to inhibit winding 138 of core 135. Thereby, keyer 110 is switched to its "ON" condition and loading of core 135 is prevented. A control pulse from trigger 125 in response to a signal on lines 8 and 9 energizes input terminal "S," resulting in the opposite conditions for flip-flop 140, thus causing keyer 115 to be switched on and core 130 to be inhibited. Normally, flip-flop 140 is switched only in response to the first character of a message, or string of messages, but either apparatus 1 or 10 can break-in at any time, if desired or necessary.

Pulse-control flip-flop 150 is preset so output-terminal "B" is conducting and output-terminal "A" is cut-off by clear-load switch 23 (FIG. 4) connected to the R input terminal via terminal 81 and an isolating diode. In this condition both Schmitt triggers in 120 and 125 are energized and ready to function. A control pulse from either loop trigger 120 or line trigger 125 to input terminal "S," switches flip-flop 150 causing terminal "B" to cut off and terminal "A" to conduct. In this condition, Schmitt triggers 124 and 129 are de-energized because their input power is eliminated and unit 200 is turned-on since power is supplied thereto via terminal 191 and lead 91 from flip-flop 150 "A" output terminal. The last (22nd) clock pulse for a character, generated by unit 200, serves as a reset pulse and is supplied through lead 92, terminal 192 to input-terminal "R." This pulse cuts-off "A," thereby de-energizing unit 200, turns on "B" causing the two Schmitt triggers 124 and 129 to be energized, and completes the cycle for that character.

Figure 3:
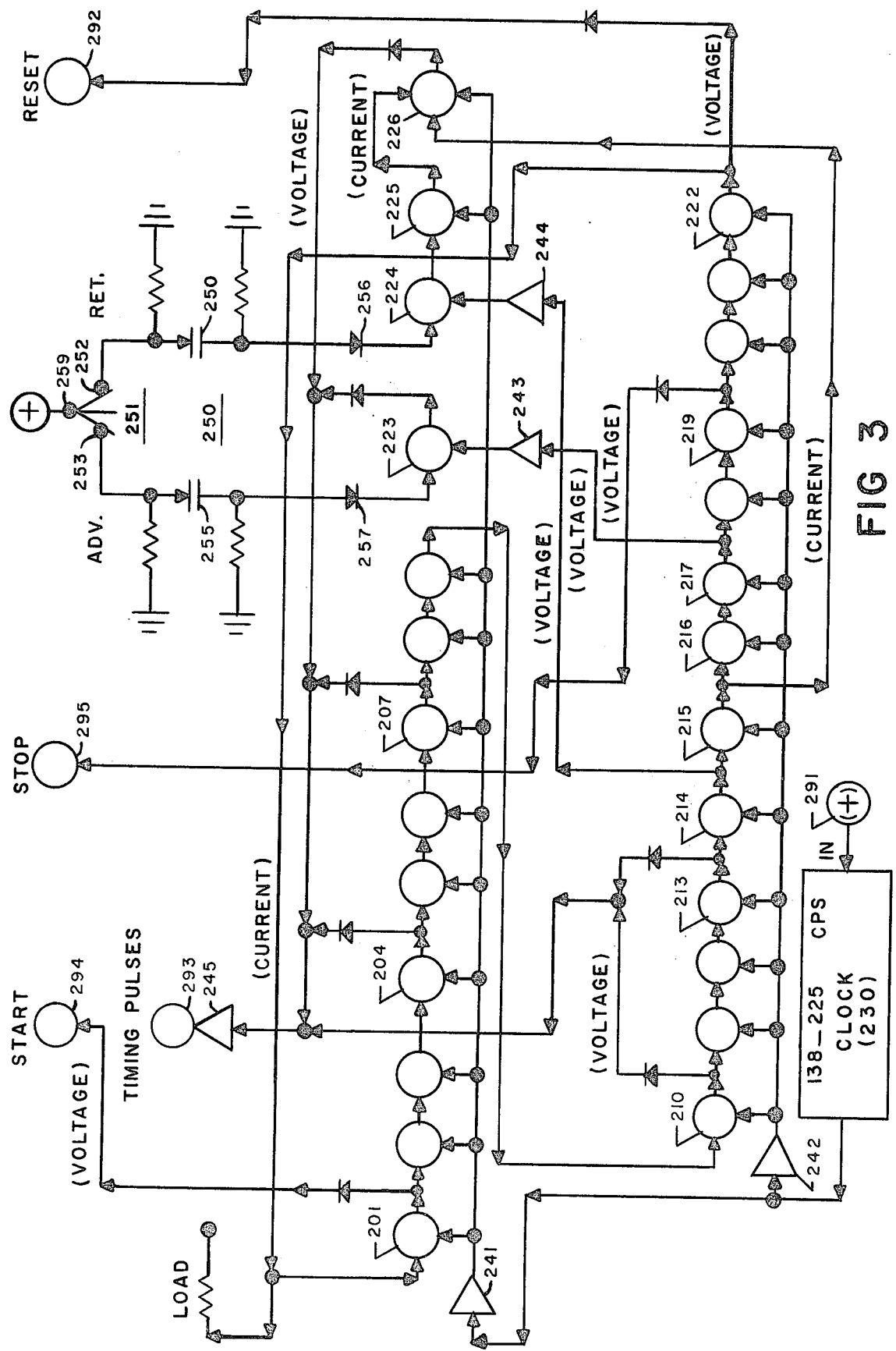
FIG. 3 is a block diagram of the Timing and Control Unit, (200)

Flip-flop 160 is pre-set by the connection of the load terminal 26 of switch 23, FIG. 3, to its "S" terminal via terminal 81 and an isolating diode, so its output-terminal "A" is conducting when operation is initiated. Both keyers 110 and 115 are conducting in response to the signal supplied thereto from terminal "A" of flip-flop 160. The first input pulse received for a given character is the start control pulse from unit 200 supplied through lead 94, terminal 194 to input-terminal R of flip-flop 160. This cuts-off the "A," output terminal of flip-flop 160, reducing the signals to control terminals 111 and 116 of keyers 110 and 115, thereby permitting the keyers to open and close in response to control voltages from flip-flop 140. Only one of the keyers 110 or 115 is still held in the conducting condition because a control voltage is supplied thereto from the appropriate output-terminal of flip-flop 140. The other keyer becomes non-conducting, opening its circuit and sending a start (no-current) baud over the line 8, 9 or loop 2, 3, as appropriate. The seventh input pulse received for a given character is the stop control pulse from unit 200 supplied through lead 95, terminal 195 to input-terminal S of flip-flop 160. The stop pulse turns-on output-terminal "A" thus turning on both keyers 110 and 115, resulting in steady marking signals on both the loop 2, 3 and the line 8, 9 until the next start-baud is received.

For the five "intelligence" bauds, the control signals to input terminals "R" and "S" of flip-flop 160 are received from mixers 180 and 185. Space control signals are supplied to input terminal "R" from mixer 180 and mark control signals are supplied to input-terminal "S" from the mixer 185. The keyers 110 and 115 are operated in response to the mixer output signals from output-terminal "A" of flip-flop 160, as previously described for the start and stop control pulses.

The key converter 170 contains three, 4-winding cores, identical with cores 130 and 135, and operated from the common driver 174. Core 171 is a "ones" generator, its input winding being weakly biased to positive magnetic saturation through a current limiting resistor so a pulse is obtained from output winding 117 thereof each time a timing pulse occurs. Core 172 is a complement-generator to reverse the polarity of the signal applied to its inhibit winding from terminal 196 and core 173 is a delay stage. The inhibit winding of core 172 and input winding of core 173 are connected in series circuit with key generator 300, lead 96, terminal 196, and ground-return. The current read-out circuit from core 171 through the input winding of 172 is loaded by diode 176 and dummy resistor 177 to balance the impedance of the core 172 inhibiting circuit. The current read-out terminals of cores 172 and 173 are grounded via resistors which balance the impedance of the input windings. The voltage read-out terminals 106 of cores 172 and 173 are coupled to input terminals 183 and 184 of mixers 180 and 185, respectively, via leads 178 and 179. The inhibit windings of cores 171 and 173 are not used and may be eliminated.

The key-converter 170 converts binary-key current-pulses supplied to the inhibit and input windings of cores 172 and 173 via terminal 196 from key-generator 300 to binary-key voltage pulses to mixers 180 and 185 via leads 178 and 179. For a "one" read out from key generator 300 there is a voltage-pulse on lead 179, with a delay of one timing pulse, but no output signal on lead 178 because core 172 is inhibited thereby. For a "zero," i.e. no read out from key generator 300, there is a voltage-pulse on lead 178, with a delay of one timing pulse, because switching of core 172 is not inhibited while "ones" generator core 171 is supplying signal to its input winding.

Mixers 180 and 185 are preferably transistorized binary half adders which produce an output signal according to the Boolean function $A\bar{B}+\bar{B}A$, where $\bar{A}$ and $\bar{B}$ are the binary signals supplied to the mixer input terminals at any one time and A and B are the complements of A and B. Thus, if both signals supplied to a mixer are the same, i.e. both "zero" or "one," the output is signal "zero," while a "one" output signal is produced if the input signals are different. It is necessary to employ two mixers in order to obtain an actual indication of both mark and space signals. Since the input signal to terminal 183 is of the opposite sense of that to terminal 181, the output voltages of mixers 180 and 185 are the complement of each other, i.e. when the signal to terminal 183 is zero, the signal to terminal 184 is one, and when the output signal of mixer 180 is zero the signal of mixer 185 is one and vice versa. These output voltages operate one of the keyers 110 or 115 through flip-flop 160 so keyer 110 is opened and closed in accordance with the enciphered message and keyer 115 is actuated in accordance with the ciphered message. One preferred form of mixer is illustrated in FIG. 7, described infra.

Also, the output voltage of mixer 185 is fed through an isolating diode and current limiting resistor to terminal 198, and thence through lead 98 to input terminal 498 of comparator 400. When coincidence between the output signals of mixer 185 and core 130 at terminal 197 occurs for 64 successive timing pulses, comparator 400 produces a signal at terminal 199 to lock line keyer 116 in the closed condition.

The timing and control unit 200 (FIG. 3) performs the clock-pulse generation, timing functions, timing-pulse generation and control-pulse generation of the equipment. It also contains provision for manually correcting synchronism of the key generator in a step-by-step manner while the equipment is in operation.

The pulse-generator or clock 230 consists basically of either a free-running multivibrator or a blocking-oscillator as preferred, plus a pulse-shaping network in the output-circuit to produce the pulse-lengths and shapes required by the associated magnetic shift-register units or "cores." The clock-pulses must be flat-topped, with comparatively short rise and decay times and pulse-lengths (between half-power points) in the order of 2 to 7 micro-seconds, to suit the particular design of cores used.

Generator 200 is started by supplying voltage thereto from the "A" output terminal of flip-flop 150 via terminals 191 and 291. It produces pulses at variable clock rates, controlled by a potentiometer (not shown), as follows:

| Teletypewriter Speed | Clock rate | Clock-pulse interval |
| --- | --- | --- |
| 60 wpm = 368 opm | 138 pps | 7-1/4 millisecond |
| 67 wpm = 404 opm | 151.5 pps | 6-2/3 millisecond |
| 75 wpm = 450 opm | 169 pps | 5-9/11 millisecond |
| 100 wpm = 600 opm | 225 pps | 4-4/11 millisecond |

The magnetic commutator contains 22 magnetic shift-register units or cores 201–222, connected as a conventional ring-counter (recirculating-loop) with one exception, described later. The magnetic shift-register units are of the conventional one-core-per-bit type and may be identical with 4-winding cores 130, 135 and 171–173 used in unit 100, or the fourth (inhibit) winding may be omitted, if preferred.

The first stage 201 is pre-loaded with a "one" due to its connection to the load terminal of switch 23, FIG. 4. The input winding of core 201 is automatically reloaded at the end of an operating cycle by the current read-out from the last core 222. The stored "one" is shifted from core 201 to core 202 on the first clock pulse, and thence shifts one core to the right with each successive clock-pulse. The input-winding of core 226 is series connected with the input-winding of core 216 and both cores are loaded together from the current read-out of core 215 on the fifteenth clock pulse. Thus, the fifth timing pulse is normally produced by core 226.

Voltage read-outs from the cores driven directly from the clock-pulses are as follows:

| Clock-Pulse | Core | Lead | Function | Remarks |
| --- | --- | --- | --- | --- |
| 1 | 201 | 94 | Start Pulse | to flip flop 160, terminal "R" |
| 4 | 204 | 93 | 1st Timing Pulse - | to amplifier 245 and core timing windings |
| 7 | 207 | 93 | 2nd Timing Pulse - | to 245 |
| 10 | 210 | 93 | 3rd Timing Pulse - | to 245 |
| 13 | 213 | 93 | 4th Timing Pulse - | to 245 |
| 16 | 226 | 93 | 5th Timing Pulse - | to 245 |
| 19 | 219 | 95 | Stop Pulse - | to flip-flop 160, |
| 22 | 222 | 92 | Reset Pulse - | terminal "S" to flip-flop 150, terminal "R" |

Isolating diodes are provided in the voltage read-out leads from cores 201, 219, and 222 to prevent sneak currents. The voltage read-out terminals of cores 204, 207, 210, 213, 226 and 223 are coupled to pulse-amplifier 245 via suitable isolating diodes to provide the timing pulses for every core in the system requiring them, i.e. those of FIGS. 2, 4, 5 and 6. The commutator 201–222 thus operates the scrambler on a 7.33 timing-basis as a sufficiently close approximation to the 7.42 timing basis of American teleprinters. When the clock-rate is adjusted to give the same baud-lengths as the associated teleprinter, the 1.33 (normal baud-length) stop baud is supplemented by a 0.09 baud-length rest period which is 1-1/5% of the character-length.

The clock 230 is coupled to two conventional transistor-amplifiers or drivers 241 and 242, the first of which drives eleven cores 201–209, 225 and 226 in a series-string and the second drives thirteen series cores 210–222. Neither string has to circulate more than a single ONE, so the drivers 241 and 242 are not overloaded, but it is inadvisable to attempt to drive all 24 cores from a single low-voltage transistor-driver. The voltage-output-terminal of core 214 is coupled to the input-terminal of the driver 244 which drives or reads-out the retard buffer-storage core 224 immediately after the fourteenth clock-pulse, a series resistor (not shown) supplying the impedance normally supplied by five other cores. The voltage outout terminal of core 217 is coupled to the input terminal of driver 243 which drives the advance buffer-storage core 223 immediately after the seventeenth clock pulse, with another series resistor (not shown) limiting the "drive" current. Drivers 241, 242, 243 and 244 are preferably identical with 174. Pulse amplifier 245 may be identical with them or may be specially designed, as preferred.

The key synchronizing corrector 250 consists of a corrector switch 251 with associated circuitry plus magnetic cores 223–226. Core 226 must be of the 4-winding one-core-per-bit type, but either 4-winding or 3-winding cores can be used for cores 223, 224, and 225. Switch 251 is a single-pole 3-position toggle switch, spring-loaded to the off or center position. The pole 259 is connected to the "+" power supply (approximately 20 volts DC). The advance contact 253 is coupled to the input winding of core 223 through capacitor 255 and diode 257. The retard contact 252 is coupled to the input winding of core 224 through capacitor 254 and diode 256. Both sides of capacitors 255 and 254 are connected to ground through resistors, which discharge these capacitors when switch 251 is open.

Manual setting of switch 251 to contact 253, loads a ONE into core 223. Switch 251 must be released and capacitor 255 discharged before another ONE can be loaded into core 223. Normally, the voltage read-out from core 217, occurring at the seventeenth clock-pulse, causes a "zero" read-out of core 223 which does not effect the output signal of amplifier 245. When core 223 has been manually loaded, the seventeenth clock-pulse causes a "one" to be read out of core 223 and a sixth timing pulse for that character coming within the fifth intelligence baud, is supplied from amplifier 245 to the core timing windings. Thus, the key signal produced by unit 300 is advanced by one binary-digit in response to energization of terminal 253.

In similar manner core 224 normally reads out a ZERO for the fourteenth clock-pulse. When core 224 has been manually loaded, by closing armature 259 on contact 252, a "one" is read out immediately after the fourteenth timing-pulse, thus loading a "one" into core 225. The next clock-pulse simultaneously reads-out core 215 through the input windings of cores 216 and core 226, connected in series, and core 225 through the inhibit winding of core 226. The inhibit winding signal has a greater effect on the core than the signal supplied to the input winding of core 226 and the core remains in its "zero" condition (negative residual saturation) to which it had been switched by the previous fourteenth clock-pulse. Therefore on the sixteenth clock-pulse, core 226 reads out a zero which does not affect the output signal of amplifier 245. This causes the fifth timing pulse for that character to be omitted and retards key-generator 300 output signal by one binary-digit.

When the receiving scrambler gets out of synchronism with the transmitting scrambler it will get back in character synchronism in about five characters, without any effort on the operator's part. Occasionally, key-synchronization is restored but normally the receiving key is five bits out of synchronism. Without the line anti-false-start-trigger 125, previously described, the receiving key generator would usually be ahead of the transmitting key generator by five (5) bits, so 5 retard corrections would be required. With the line anti-false-start-trigger 125 the probabilities are about equal, with possible a slight tendency for the receiving key generator to fall behind five (5) bits and then require 5 advance corrections.

Military on-line cryptographic systems may be "netted" (multi-party line) or operated over one-way radio broadcast circuits with many receivers and only one transmitter. Opportunities for re-synchronization are therefore few and far between and lack of provision for "in-operation" correction of synchronism has greatly limited the use of earlier on-line cryptographic systems. For a simple 2-party line it is possibly satisfactory to shutdown and re-synchronize, but even here it is more convenient to use manual correction at the receiving end and then request repetition of the word or words that were incorrectly deciphered. The additional components required for "in-operation" sync-correction are very simple, relatively inexpensive, and add much to the operational value of the system.

The un-numbered cores in FIG. 3, serve only to pass the load to the next core to the right introduce delays of one clock-pulse. It is obvious that if the corrector 250 were not supplied, the fifth timing pulse would be taken from the voltage-output terminal of core 216, and an isolating diode added to that lead. Also the voltage read-out for driving core 224 could be taken from core 218 just about as satisfactorily as from core 217.

In FIGS. 4 and 5 of the drawings, unless otherwise indicated, each circle is indicative of a magnetic core binary logical element and the leads coupled thereto are connected to respective core windings. Driving pulse signals are fed to the cores by the lead connected to the bottom of each core. An input pulse on the lead connected to the lefthand side of each core will normally result in an output pulse on the lead connected to the righthand side at the time a driving or clock pulse is applied to the core. Pulses applied to the upper input terminal of each core, as shown on the drawings, serve to block or inhibit the generation of an output pulse on the righthand output lead, even when a pulse is generated on the lefthand input lead.

Thus, it should be apparent that the leads emanating from the bottom, left, top and right of each circle may be considered as connected to the timing, input, inhibit, and output windings, respectively, of a particular core.

It will be understood, therefore, that each core and its associated circuitry serves as an inhibit or "not" binary logical circuit. A lgocial "or" circuit which produces an output signal of "one" polarity when any or all of the input signals applied thereto are of the "one" polarity is formed by feeding the output signals of two or more binary core circuits through separate diodes and connecting the diodes together at a single terminal. In Boolean algebra terminology it is the general practice to designate an "or" operation by the symbol +. A binary "and" circuit is formed by cascading the output signals of two magnetic core circuits, i.e. applying the output signal of a first core to the inhibit terminals of a second core and applying a first signal to the inhibit winding of the first core and a second signal to the standard input winding of the second core. In Boolean algebra terminology the "and" operation signifies that all of the input signals applied to a particular stage must be equal to "one" in order to obtain a "one" output signal. The "and" function is normally represented by the multiplication of two variables.

FIGS. 4 and 5 of the drawings, a schematic representation of the key generator 300, comprises a shift register 11 having nine magnetic cores 12–20. Each of these cores is simultaneously supplied with clock pulses from amplifier 245. The clock pulses cause the stored signal state in each stage to be transferred to the succeeding stage to which it is connected. Each stage of the shift register comprises a standard bistable magnetic core, an associated temporary storage capacitor and suitable pulse shaping and delaying networks between it and the next stage. Since this shift register construction is well known in the art it is not deemed necessary to explicitly disclose the circuitry employed.

Prior to the operation of the device, spring biased switch 23 is manually brought into contact with terminal 24. Thus the B+ source coupled to terminal 24 by way of terminal 25 and switch 23 applies a prolonged advance pulse to all of the cores and the flip-flops 150 and 160. This pulse switches all of the cores to the "zero" state and holds them in this condition while the associated temporary storage capacitors are discharged through the input windings of the next core. This erases any "ones" previously stored in the cores in a manner well known to those skilled in the art. In this disclosure negative saturation of the magnetic cores is to be interpreted as a zero binary signal.

Four feedback shift registers 11, 27, 28 and 29 having 11, 13, 17 and 19 stages, respectively, the numbers 11, 13, 17 and 19 being different co-prime numbers, are employed to produce signals having recurrance durations of $2^N-1$ bits; where N is the number of stages in each register. Preloading of certain selected stages in each shift register 11, 27, 28 and 29 is achieved when spring bias switch 23 is released from terminal 24 and is swept past loading terminal 26 to operating terminal 31. This causes the magnetic cores selected by the load selector switches 32, 33, 34 and 35, associated respectively with shift registers 11, 27, 28 and 29, to change state from "zero" to "one," thereby preloading certain binary information therein. The number of load selector switches utilized depends upon the number of stages in each of the shift registers, i.e. shift register 11 having nine magnetic cores requires nine different switches, while shift registers 27, 28 and 29 having 11, 15 and 17 cores, respectively, require load selector switches having capacities equal to the number of stages contained therein. While load selector switches 32 have been shown as being of the toggle switch variety, it is to be understood that it may be more desirable to employ multi-position rotary switches for ease of operation and for compactness of size. By actuating any desired load switches it is to be understood that the number of pre-loaded stages in any of the respective shift registers may be varied in accordance with any particular binary coded information.

After switch 23 returns to its normal position wherein switch 23 alights on terminal 30, timing pulse amplifier 245 is coupled into the circuit and simultaneously supplies timing pulses to each of the magnetic cores employed in the complete circuit. It is to be understood that suitable amplifiers may be needed to drive strings of six or eight of the magnetic stages in series at one time. The type and number of amplifiers utilized is within the skill of the art and may be determined by ordinary design techniques.

As timing pulses are supplied to each shift register stage, the binary signal stored therein is transferred from one core to the next core. Thus, if it is assumed that cores 12, 13 and 14 store the quantities "one," "zero," "one," respectively, prior to the occurrence of a clock pulse, these cores will shift their pulses to the next cores so that cores 13, 14 and 15 will be stored with the values one, zero, and one, subsequent to the next clock pulse. Selected stages of each shift register 11, 27, 28 or 29 are connected to a respective feed back mixer circuit 36, 37, 38 or 39. Two or four register stages are connected to the feed back mixer logical circuit, depending upon the desired capacity of the machine. In order to effectively utilize each stage of all of the shaft registers, it is necessary to connect the last stage of each shift register to the feedback mixer circuit to which it is associated. Connections between the shift register and the feed back mixers may be accomplished by conventional removable plug board connectors. These interconnections may be periodically changed so as to change the preprogramed output signal of the unit.

The logical circuitry associated with each of the feed back mixers is such that a binary output signal having a particular polarity, e.g., "one," will be produced when all but one of the input signals to the feed back mixer circuit are the same. In other words, if all of the signals supplied to mixer 36 are of the same state, either "zero" or "one," a "zero" output pulse will be obtained from that feed back mixer. Likewise if a pair of signals supplied to mixer 36 are identical and another pair are oppositely identical, a "zero" signal will be obtained from mixer 36. With four signals supplied to mixer 36, a "one" signal will be obtained at its output terminal only when three of the signals applied thereto are identical and the other signal is of opposite polarity. If "one" signals coupled to plug board terminals 41, 42, 43 and 44 are indicated by X, Y, Z and N, respectively, and "zero" signals applied to these terminals are respectively indicated as $\bar{X}$, $\bar{Y}$, $\bar{Z}$ and $\bar{N}$, ($\bar{X}$ is usually read "not X" or the complement of X), the Boolean function obtained from feedback mixer 36 on lead 45 may be given by the function $N\bar{X}\bar{Y}Z + \bar{N}X\bar{Y}Z + \bar{N}X\bar{Y}\bar{Z} + N\bar{X}\bar{Y}\bar{Z} + \bar{N}XYZ + N\bar{X}YZ + NX\bar{Y}Z + NXY\bar{Z}$. The truth table #1 for the signal appearing on lead 45 is given in the table appearing at the end of the specification when four input signals are fed to the feed back mixers. If only two leads are connected between shift register 11 and feed back mixer 36 so that two input signals, N and X, are supplied thereto, the Bollean function of the signal appearing on lead 45 is $\bar{N}X + N\bar{X}$. The truth table #2 for two input signals applied to feed back mixer 36 appears at the end of the specification.

The actual construction of each feed back mixer 36–39 is identical and it is deemed necessary to describe only one of these circuits. Feed back mixer 36 comprises six magnetic cores 47, 49, 56, 57, 58 and 59 of the type previously described. In the particular disclosed embodiment, plugboard terminals 41, 42 and 43 are respectively connected to the output windings of magnetic cores 12, 15 and 17 of shift register 11. It is to be understood, however, that terminals 41, 42 and 43 may be connected to any of the stages in shift register 11 and that the particular arrangement shown is for purposes of illustration only. The signal appearing at terminal 41 is simultaneously applied to the input winding 46 of core 47 and to the inhibit winding 48 of core 49. Similarly, the signal appearing at terminal 42 is simultaneously applied to inhibit winding 51 of core 47 and to input winding 52 of core 49. The output windings 53 and 54 of cores 47 and 49, respectively, are coupled to terminal 55 by means of isolating rectifiers connected to each of the output windings. The connection of windings 53 and 54 to terminal 55 serves as an "or" gate.

For purposes of explanation, a pair of examples will be given to illustrate the manner in which the logical elements employed in this circuit function. It will be assumed that core 12 is storing a "one" and that core 15 is storing a "zero" at the time a timing pulse is produced by amplifier 245. At such a time, a positive pulse is supplied to input winding 46 of core 47 by means of terminal 41 while no pulse is applied to inhibit winding 51 from terminal 42. The application of these pulses to core 47 causes it to switch to a positive state of magnetization and (at the next timing pulse) produce a positive voltage at output winding 53 that is supplied to terminal 55. In core 49, the application of a positive pulse to winding 48 inhibits the core from changing its state and no pulse is subsequently produced at its output winding 54. Thus, if core 12 is storing a "one" and core 15 is storing a "zero," a "one" output will appear at terminal 55 when the next timing pulse is generated and a "one" will also be produced if the state of cores 12 and 15 are reversed due to the symmetry of the logical circuitry associated with cores 47 and 49. If both cores 12 and 15 are in the "zero" state when a timing pulse is applied thereto a "zero" will appear at terminal 55. This may be explained as follows: when timing pulses are applied to cores 12 and 15 no output signals will be derived therefrom and cores 47 and 49 will remain at rest. If both cores 12 and 15 have "ones" stored therein at the time a timing pulse is applied thereto, a "zero" will also be fed to terminal 55 because these pulses will inhibit the loading of both cores 47 and 49 preventing any positive output signals to be generated thereby. The circuit comprising cores 47 and 49 is commonly referred to as a binary half adder.

The output signal from the stage associated with core 17 of shift register 11 is simultaneously applied to the input winding of core 56 and the inhibit winding of core 57. The input winding of core 57 and the inhibit winding of core 56 are simultaneously supplied with pulses indicative of the state of the last stage 20 of shift register 11 by lead 44. The output windings of half adder cores 56 and 57 are combined together to form an "or" circuit at terminal 61.

Half adder cores 58 and 59 have applied thereto the combined signals from the other cores 47, 49, 56 and 57 of feed back mixer circuit 36. The signal appearing at terminal 55 indicative of the Boolean functio $X\overline{Y}+\overline{X}Y$ is applied to the input winding of core 58 and the inhibit winding of core 59. In a similar fashion the signal appearing at terminal 61 indicative of the Boolean function $N\overline{Z}+\overline{N}Z$ is supplied to the inhibit winding of core 58 and the input winding of core 59. The output winding of core 59 is coupled through an isolating rectifier and lead 45 to the first core 12 associated with shift register 11. In this manner four output signals from shift register 11 are combined in feed back mixer 36 to provide a single input for the stage of the first register associated with core 12.

Recirculation of the information contained in shift register 11 is thus established providing a feed back shift register that enables the repetition or recurrence rate of the signals stored in shift register 11 to be $2^N-1$ bits, where N is the total number of stages employed in the shift register. In this particular shift register, having nine cores, there are actually 11 stages because feed back mixer 36 inserts a two bit delay in the signals applied thereto. Thus, for the first two timing pulses generated by amplifier 245 no input signal is fed to the input winding of core 12 from feedback mixer 36 because of the inherent delay associated with the cores in transferring information into and out of them, unless the cores of mixer 36 are also initially loaded through selector switches (not shown) in a manner similar to that disclosed in connection with register 11.

The feed back mixer circuitry associated with each of the other shift registers 27, 28 and 29 is identical to that employed for shift register 11. However, it may be desirable to utilize only two input signals to some of these feed back mixers rather than all four, depending on the desired capacity of the machine. Shift registers 27, 28 and 29, respectively, contain 11, 15 and 17 magnetic cores therein and may be considered as 13, 17 and 19 state shift registers, respectively, because of the feed back mixers associated therewith.

Output signals from the last stage of each shift register 11, 27, 28 and 29 are combined in another logical Boolean algebra circuit, output mixer 65 containing cores 66, 67, 68, 69 and 72. Output signals from the penultimate stages of shift registers 11 and 28, e.g. core 19 of register 11, are respectively connected to the inhibit windings of cores 66 and 67. Core 70, commonly referred to as a "ones generator" supplies the input windings of cores 66 and 67 with power pulses each time a timing pulse is produced by amplifier 245. In this manner, both cores 66 and 67 serve as inverting circuits for the next to the last stages of shift registers 11 and 28, respectively. Thus, if a "zero" is stored in core 19 at the time a timing pulse is produced core 66 will not inhibit the passage of a pulse from "ones generator" 70 through core 66. If, however, a "one" is stored in core 19, a "zero" will be produced at the output winding of core 66 because the signal applied to its inhibit winding blocks its loading and the generation of a subsequent output signal. Core 67 similarly responds to the next to the last stage of shift register 28. The inhibit winding of core 68 is supplied with the output signal of core 66 while the input winding of core 68 is fed with a signal indicative of the state of the last stage of shift register 27. In this manner, a signal is obtained at the output winding of core 68 indicative of the Boolean function AB; where A is the state of the last stage 20 of shift register 11 and B is the state of the last stage of shift register 27 at the same time as when signal A is produced. It should thus be apparent that the signal from the next to the last stage of shift register 11 is supplied to core 66 rather than that from the last stage because of the inherent one bit delay produced by the core. Stated differently, when core 68 is receiving a signal on its inhibit and input windings these signals are indicative of the state of the last stages of both shift registers 11 and 27 at the same time.

In a similar manner, cores 67 and 69 are respectively supplied with input signals from the penultimate stage of shift register 28 and the last stage of shift register 29; the inhibit winding of core 69 being supplied with the output signal from core 67 and the input winding of core 69 being coupled to the last stage of shift register 29. Thus, the signal supplied to terminal 71 from output winding 69 is indicative of the Boolean function CD where C and D are the signals stored in the last stage of shift registers 28 and 29 at the same time.

Core 72 serves as a complimentary generator and produces an output pulse having "one" polarity that is coupled to output terminal 73 only when the last stage of each shift register 11, 27, 28 and 29 is in a "zero" state. This is accomplished by connecting the input winding of core 72 to the output winding of core 70 and by connecting the inhibit winding of core 72 to the last stage of each shift register by means of isolating diodes. Thus, if the last stage of any of the shift registers is in the "one" state, a pulse will be supplied to the inhibit winding and no output will be fed to terminal 73 from core 72. In Boolean terms, core 72 produces an output signal in accordance with the function $\overline{A+B+C+D}$, where A, B, C and D are as previously defined.

It is thus seen that output mixer 65 produces a Boolean signal at terminal 73 that will assume a "one" state when all of the input signals applied thereto are either similar, i.e. all or none are zeros, or will produce a "one" output signal when certain pairs of the input signals applied to the mixer circuit are in the "one" state. The signal at terminal 73 will be in the "zero" state, in response to one half of the combinations of signals fed thereto and it will be in the opposite "one" state in response to the other half of the combinations of signals fed to it. Specifically, the output signal at terminal 73 will be in accordance with the Boolean function $AB+CD+\overline{A+B+C+D}$. The truth table #3 for this function appears at the end of the specification. The signal at terminal 73 will not repeat its cycle for $10^{18}$ bits generated by amplifier 245 and will have zero information biasing for the complete cycle. In utilizing a keying rate of approximately 100 words per minute no recurrence of signals produced at terminal 73 should occur for $10^9$ years, i.e. one thousand million years.

FIG. 6 is a schematic diagram of the Comparator, which is an optional safety device that can be applied to this or other forms of binary scramblers. Binary half adder 440 comprises cores 441 and 442 connected as a conventional binary half-adder but the current readouts, rather than voltage readouts, are used. The current read-out terminals of these cores are coupled through isolating diodes to the inhibit windings of complement generator core 444 and the input winding of delay core 445. Teletypewriter clear text signal from the current read-out terminal of core 130 is supplied via lead 97 to the input winding of core 441 and the inhibit winding of core 442. The line of cipher text signal from mixer 185 is coupled via lead 98 to variable resistor 446, the inhibit winding of core 441 and the input winding of core 442. Variable resistor 446 permits balancing the two currents so that half-adder containing core 441 and 442 will function reliably. Cores 441-445 are supplied with timing pulses from amplifier 245, simultaneously.

Core 443 is a conventional "ones" generator and supplies current to the input winding of core 444 through an isolating diode upon each occurrence of a timing pulse. The current read-out terminals of cores 444 and 445 are grounded through external resistors to give proper impedance to the "current" circuits.

Cores 443, 444 and 445 have the same functions and are coupled by the same circuits as cores 171, 172 and 173, respectively, in unit 100. Core 444, having its inhibit winding connected to the half adder output terminal inverts the half adder output signal and core 445 having its input winding in series with the inhibit winding of core 444 inserts the same delay introduced by core 444. Thus, the output voltages of cores 444 and 445 occur simultaneously and are of opposite polarity. The output signal of core 444 is supplied simultaneously to the shift windings of the cores in quatinary counter 140 through amplifier 417. Successive pulses from core 444, indicative of successive similarities between the pulses at terminals 497 and 498, shifts the signal stored in the cores of counter 410 from one core to another. After four successive similarities in the signals at terminals 498 and 497, an output pulse is generated by core 414. This output pulse reloads core 411, since it is fed back to its input winding, and shifts the signal stored in counter 420 from one stage to the next.

Similarly, when four successive pulses are supplied to amplifier 427, due to sixteen successive similarities at terminals 497 and 498, an output pulse is obtained from core 424. This pulse is supplied back to the input winding of core 421 and to the drive windings of the cores in quatinary counter 420 through amplifier 437.

Four consecutive output pulses from core 424, i.e. 64 successive similarities at terminals 497 and 498 causes an output pulse to be generated by core 434 of counter 430. This pulse is supplied back to the input winding of core 431, thereby reloading the core, and to the S input terminal of flip-flop 470. Flip-flop 470 is accordingly switched to actuate visual and aural alarms and keyer 115 is closed by the voltage supplied to terminal 116 thereof through terminals 499 and 199. Thereby, no signal is transmitted from local teletypewriter 1 through keyer 115 to remote scrambler 10 and an alarm is presented to the operator indicating probable malfunction. Malfunction is highly probable because the chances of sixty four consecutive "zeros" from the key generator is extremely remote (1 in $10^{13}$ words).

Every time that the signals at terminals 497 and 498 are different, prior to the occurrence of sixty three consecutive similarities thereof, a trigger pulse is supplied from the voltage output terminal of core 445 to one-shots 450 and 460. "Clear" one-shot 450 generates a 50 millisecond output pulse which is coupled to the driving circuits of the 3 quatinary counters 410, 420, and 430, thus clearing the cores of their previous loads. "Load" one-shot 460 is coupled to the inhibit windings of cores 411, 421 and 431 in series fashion but in reverse polarity; its 100 millisecond output pulse persists beyond the clearing pulse and thus reloads the first stage of each of the 3 quatinary counters 410, 420 and 430.

Initial erasing and loading of the cores is accomplished by the connection of clear terminal 24, FIG. 4, through terminal 464 to the drive windings of the cores in counters 410, 420 and 430 and the connection from load terminal 26 to the inhibit windings of cores 411, 421 and 431. The pulses from terminals 464 and 466 actuate the cores in substantially the same manner as those produced by one-shots 450 and 460.

With this comparator, there is a possibility of false alarm because sixty three similar consecutive pulses at terminals 498 and 497 results in core 434 being loaded. If there is a difference between the next two pulses, an output pulse is obtained from core 434 because of the signal applied to the drive winding thereof from pulse shaper 450. The possibility of this occuring is extremely remote, 1 in $2^{48}$ bauds or 1 in $10^{13}$ words.

FIG. 7 is a schematic diagram of one preferred form of the binary adders or mixer circuits 180 and 185 of FIG. 2. The circuit comprises four N-P-N transistors 701-704 and a P-N-P transistor 705 for inverting the combined signal from the other transistors. The bases of emitter follower transistors 701 and 704 are supplied with text and key signals from terminals 782 and 783, respectively. The emitters of transistors 701 and 702 are connected together and to resistor 705 and to a voltage divider comprising resistors 706 and 707 as well as shaping capacitor 708. The junction between resistors 706 and 707 is directly coupled to the base of transistor 703. Similarly, the emitters of transistors 703 and 704 are connected to a network comprising resistors 711, 712 and 713 as well as shaping capacitor 714.

The collectors of transistors 701 and 704 are directly connected to power supply terminal 715. The collectors of transistors 702 and 703 are coupled to terminal 715 through load resistor 716 and to shunting shaping capacitor 717 as well as to the base of transistor 705 via current limiting resistor 718. Load resistor 719 is connected between the collector of inverter stage 705 to provide the proper polarity voltage to flip-flop 160, indicative of the combined signals on leads 783 and 782.

The circuit operates so that a "one" signal on lead 782, suddenly increases conduction through transistor 701, thereby raising its emitter voltage and tending to increase the collector voltage of transistor 702. However, the collector voltage cannot suddenly increase due to capacitor 717. With a "one" input signal to terminal 783, capacitor 717 also prevents sudden changes in the collector voltage of transistor 703 in a similar manner.

The sudden change in voltage across resistor 705 in response to a "one" input signal to terminal 782 is supplied to the base of transistor 703 through capacitor 708 and the resistance voltage divider. This change has a tendency to reduce the collector voltage of transistor 703 which is cancelled by the tendency of the collector voltage to increase if a "one" is simultaneously fed to terminal 783. Capacitor 717 insures that the collector voltage of transistor 703 does not suddenly change if there is a slight mis-synchronism in the leading edges of the "one" signals at terminals 782 and 783. In a similar manner, transistor 702 is switched by only one of the signals at terminals 782 and 783 but is not actuated by both.

After the "one" input signals have subsided the bases of transistors 702 and 703 are still positive due to the storage properties of capacitors 708 and 714. These capacitors discharge at approximately the same rate and thereby decrease conduction through transistors 702 and 703 similarly. Thus, even if there is mis-synchronism between the trailing edges of the pulses at terminals 782 and 783, transistors 702 and 703 operate together and no spurious pulse is supplied to transistor 705.

An output pulse is supplied to transistor 705 if only one input terminal 782 or 783 receives a pulse. If neither input terminal receives a pulse, the circuit is dormant and if both terminals receive pulses, no output signal is produced due to the described cancellation process.

Truth Tables

| #1 | N | X | Y | Z | 4-Tap Feed-back Mixer Out | N | X | Y | Z | Out |
|---|---|---|---|---|---|---|---|---|---|---|
| | 0 | 0 | 0 | 0 | 0 | 1 | 0 | 0 | 0 | 1 |
| | 0 | 0 | 0 | 1 | 1 | 1 | 0 | 0 | 1 | 0 |
| | 0 | 0 | 1 | 0 | 1 | 1 | 0 | 1 | 0 | 0 |
| | 0 | 0 | 1 | 1 | 0 | 1 | 0 | 1 | 1 | 1 |
| | 0 | 1 | 0 | 0 | 1 | 1 | 1 | 0 | 0 | 0 |
| | 0 | 1 | 0 | 1 | 0 | 1 | 1 | 0 | 1 | 1 |
| | 0 | 1 | 1 | 0 | 0 | 1 | 1 | 1 | 0 | 1 |
| | 0 | 1 | 1 | 1 | 1 | 1 | 1 | 1 | 1 | 0 |

| #2 | N | 2-Tap Feed-back Mixer X | Out |
|---|---|---|---|
| | 0 | 0 | 0 |
| | 0 | 1 | 1 |
| | 1 | 0 | 1 |
| | 1 | 1 | 0 |

| #3 | A | B | C | D | Output Mixer Out | A | B | C | D | Out |
|---|---|---|---|---|---|---|---|---|---|---|
| | 0 | 0 | 0 | 0 | 1 | 1 | 0 | 0 | 0 | 0 |
| | 0 | 0 | 0 | 1 | 0 | 1 | 0 | 0 | 1 | 0 |
| | 0 | 0 | 1 | 0 | 0 | 1 | 0 | 1 | 0 | 0 |
| | 0 | 0 | 1 | 1 | 1 | 1 | 0 | 1 | 1 | 1 |
| | 0 | 1 | 0 | 0 | 0 | 1 | 1 | 0 | 0 | 1 |
| | 0 | 1 | 0 | 1 | 0 | 1 | 1 | 0 | 1 | 1 |
| | 0 | 1 | 1 | 0 | 0 | 1 | 1 | 1 | 0 | 1 |
| | 0 | 1 | 1 | 1 | 1 | 1 | 1 | 1 | 1 | 1 |

| #4 | Key | Ciphering Mixer Text | Signal |
|---|---|---|---|
| | 0 | 0 | 0 |
| | 0 | 1 | 1 |
| | 1 | 0 | 1 |
| | 1 | 1 | 0 |

While I have described and illustrated one specific embodiment of my invention, it will be clear that variations of the details of construction which are specifically illustrated and described may be resorted to without departing from the true spirit and scope of the invention as defined in the appended claims.

I claim:

1. A start/stop cryptographic telegraphy terminal-equipment comprising electronic means for generating clock pulses, means responsive to the clock pulses for generating timing pulses occurring at a substantially predetermined rate less than the occurrence rate at which said clock pulses are generated, means responsive to the generated timing pulses for generating a cryptograhic-key signal and means for initiating the generating of the clock pulses in response to a telegraph start signal supplied to the equipment, said last named means including means for combining the telegraph and cryptographic-key signals.

2. The apparatus of claim 1 wherein said means for generating timing pulses includes means for terminating the generating of the clock pulses when a predetermined number of clock pulses are generated.

3. The apparatus of claim 1 wherein said means for generating the crytographic-key signal comprises magnetic core elements.

4. The equipment of claim 1 including means for at will varying the number of timing pulses generated.

5. The equipment of claim 1 wherein said means for generating timing pulses comprises; a multi-stage shift register responsive to said clock pulses, and means for combining the output signals derived from certain of said stages.

6. The equipment of claim 5 further including means responsive to the output signal of the last of said stages for deactivating said clock pulse generating means while reloading a binary one into the first of said stages.

7. The equipment of claim 6 further including means for at will varying the number of timing pulses.

8. The equipment of claim 7 wherein said means for at will varying includes a phantom stage in said shift register, means for combining the output signal of said phantom stage with the output signals of said selected stages, and means for at will loading said phantom stage.

9. The equipment of claim 7 wherein said means for at will varying includes means for inhibiting coupling of the output signal of one of said selected stages to said means for combining.

10. A start/stop cryptographic telegraphy terminal-equipment comprising means for generating clock pulses, means responsive to the clock pulses for generating timing pulses and means for at will inserting and removing timing pulses, means responsive to the generated timing pulses for generating a cryptographic-key signal and means for initiating the generating of the clock pulses in response to a telegraph start signal supplied to the equipment, said last named means including means for combining the telegraph and cryptographic-key signals.

11. The equipment of claim 10 wherein said means for generating timing pulses includes a multi-output delay element driven by said clock pulses and means for combining the selected outputs of said delay element, and said means for inserting and removing includes means for effectively changing the delay introduced by said element.

12. A start/stop crytographic telegraphy terminal-equipment comprising electronic means for sequentially generating a start signal, a plurality of timing pulses and a stop signal occuring a predetermined number of timing pulses after the start signal, means responsive to the timing pulses for generating a cryptographic-key signal, means for initiating operation of said means for sequentially generating in response to a telegraph start signal supplied to the equipment and means the operation of which is initiated by the start signal and terminated independently of the stop signal for combining the cryptographic-key and telegraph signals.

13. In a start/stop cryptographic receiving terminal-equipment, electronic means for generating clock pulses, means responsive to the clock pulses for generating occurring at a substantially predetermined rate less than the occurrence rate at which said clock pulses are generated, means responsive to the generated timing signals for generating a cryptographic-key signal, said means for generating a cryptographic-key signal comprising magnetic core elements, means for initiating the generating of the clock signals in response to a received ciphered start signal and means for combining the received and cryptographic-key signals to produce a text signal.

14. A start/stop cryptographic transmitting telegraphy terminal-equipment comprising electronic means for generating clock pulses, means responsive to the clock pulses for generating timing signals occurring at a substantially predetermined rate less than the occurrence rate at which said clock pulses are generated, means including magnetic core elements responsive to the generated timing signals for generating a cryptographic-key signal, means for combining a text telegraphy signal with the cryptographic-key signal to produce a ciphered telegraphy signal, said combining means including means for initiating the generating of the clock signals in response to start bauds in the text signal and means for transmitting the ciphered signal.

15. In a start/stop cryptographic transmitting telegraphy terminal-equipment, electronic means for generating clock pulses, means responsive to the clock pulses for generating timing signals occurring at a substantially predetermined rate less than the occurrence rate at which said clock pulses are generated, means including magnetic core elements responsive to the generated timing signals for generating a cryptographic-key signal and means for combining a text telegraphy signal with the cryptographic-key signal to produce a ciphered telegraphy signal, said combining means including means for initiating the generating of the clock signals in response to start bauds in the text signal.

16. In a start/stop cryptographic receiving and transmitting terminal-equipment, electronic means for generating timing pulses, means responsive to the generated timing pulses for generating a cryptographic-key signal, means for initiating the generating of the timing pulses in response to a received ciphered start baud, means for initiating the generating of the timing pulses in response to a text telegraphy start baud and means selectively responsive to the received cipher and text telegraphy signals for combining said cryptographic key signal with said received cipher signal to generate a received text signal or for combining said cryptographic key signal with said text telegraphy signal to generate another cipher signal.

17. The combination of claim 16 including means for reading out the received text signal and for generating the text telegraphy signal.

18. The combination of claim 17 wherein the said combining means includes a half adder circuit.

19. The combination of claim 16 further including means for transmitting the generated ciphered signal and means for receiving the received cipher signal.

20. The combination of claim 16 further including means for generating an alarm signal when the another cipher signal and said text telegraphy signals are identical for a predetermined number of timing pulses.

21. The combination of claim 16 further including means for terminating said another cipher signal when said another cipher signal and said text telegraphy signals are identical for a predetermined number of timing pulses.

22. A cryptographic start/stop receiving and telegraphy terminal-equipment comprising means for sequentially generating a start signal, a plurality of timing pulses and a stop signal occurring a predetermined number of timing pulses after the start signals, means responsive to the timing pulses for generating a cryptographic-key signal, first means for initiating operation of said sequential generating means in response to a received cipher telegraphy signal, circuit means for combining the cryptographic-key and received cipher signals to produce a received text signal, said circuit means including means for initiating the operation thereof in response to the start signal and for terminating the operation thereof independently of the stop signal, second means for initiating operation of said sequential generating means in response to a text signal to be transmitted, said circuit means including means for combining the cryptographic-key signal and text signal to be transmitted to produce a cipher signal to be transmitted.

23. The equipment of claim 22 wherein said first initiating means includes means for actuating said sequential generating means only in response to start bauds of the received cipher signal and said second initiating means only in response to start bauds of the text signal to be transmitted.

24. A timing pulse generator comprising means for generating clock pulses, a shift register having a plurality of stages responsive to said clock pulses, each of said stages sequentially generating output signals means for combining the output signals of selected ones of said stages to derive timing pulses, and means responsive to the output signal of the last of said stages for deactivating said means for generating while reloading a binary one into the first of said stages.

25. The generator of claim 24 further including means for at will changing the number of pulses in said timing signal.

26. The generator of claim 25 wherein said changing means adds one pulse to said timing signal.

27. The generator of claim 26 wherein said means for at will varying includes a phantom stage in said shift register, means for combining the output signal of said phantom stage with the output signals of said selected stages, and means for at will loading said phantom stage.

28. The generator of claim 25 wherein said changing means deletes one pulse from said timing signal.

29. The generator of claim 28 wherein said means for at will varying includes means for inhibiting coupling of the output signal of one of said selected stages to said means for combining.

30. The generator of claim 25 wherein said means for changing includes means for effectively changing the number of stages of said shift register.

31. In combination, a pair of parallel binary signal sources, a counting chain having a plurality of stages, means for advancing the count of said chain when a first predetermined status of the combined Boolean values of said signals is achieved, and means for resetting the count in said chain to the first stage when a different predetermined status of the combined Boolean values of said signals is achieved.

32. The apparatus of claim 31 further including means for actuating a switch and an alarm in response to an output signal from the last stage of said counting chain.

33. A start-stop cryptographic transmitting telegraphy terminal equipment comprising electronic means for generating clock pulses, means responsive to the clock pulses for generating timing signals, means responsive to the generated timing signals for generating a cryptographic-key signal, means for combining a text telegraphy signal with the cryptographic-key signal to produce a ciphered telegraphy signal, said combining means including means for initiating the generating of the clock signals in response to start bauds in the text signal, means for comparing each baud of the ciphered signal with each baud of the text signal, means responsive to said comparing means for deriving a signal when said text and telegraphy signals are alike for a predetermined number of consecutive times, and means for transmitting the ciphered signal.

34. The equipment of claim 33 wherein said means for comparing comprises a counting chain having a plurality of stages, means for advancing the count of said chain when the bauds of said text and ciphered signals are alike, and means for resetting the count of said chain to the first stage when the bauds of said text and ciphered signals are different.

35. A start-stop cryptographic telegraphy terminal-equipment comprising means for generating clock pulses, means responsive to the clock pulses for generating timing pulses, means for at will removing timing pulses, means responsive to the generated timing pulses for generating a cryptographic-key signal, and means for initiating the generating of the clock pulses in response to a telegraph signal supplied to the equipment, said last named means including means for combining the telegraph and cryptographic-key signals.

36. A start-stop cryptographic telegraphy terminal-equipment comprising means for generating clock pulses, means responsive to the clock pulses for generating timing pulses, means for at will inserting timing pulses, means responsive to the generated timing pulses for generating a cryptographic-key signal, and means for initiating the generating of the clock pulses in response to a telegraph signal supplied to the equipment, said last named means including means for combining the telegraph and cryptographic-key signals.

* * * * *